(12) United States Patent
Krauss et al.

(10) Patent No.: US 7,401,980 B2
(45) Date of Patent: Jul. 22, 2008

(54) AXIAL BEARING

(75) Inventors: Paul Krauss, Goellheim (DE); Thomas Weinitschke, Frankenthal (DE); Helmut Eggert, Bonlanden (DE); Klaus Schappert, Winnweiler (DE); Norbert Stoll, Kriegsfeld (DE)

(73) Assignee: BorgWarner Inc., Auburn Hills, MI (US)

( * ) Notice: Subject to any disclaimer, the term of this patent is extended or adjusted under 35 U.S.C. 154(b) by 276 days.

(21) Appl. No.: 11/188,363

(22) Filed: Jul. 25, 2005

(65) Prior Publication Data

US 2006/0018578 A1 Jan. 26, 2006

(30) Foreign Application Priority Data

Jul. 23, 2004 (EP) ................................. 04017488

(51) Int. Cl.
*F16C 17/04* (2006.01)
*F16C 33/10* (2006.01)

(52) U.S. Cl. .................. 384/420; 384/368; 384/112
(58) Field of Classification Search ......... 384/295–297, 384/368–371, 420–428
See application file for complete search history.

(56) References Cited

U.S. PATENT DOCUMENTS

| 2,872,256 | A | * | 2/1959 | Thomson ..................... 384/420 |
| 3,066,990 | A | * | 12/1962 | Frohlich ..................... 384/368 |
| 4,639,148 | A | * | 1/1987 | Tamura et al. .............. 384/420 |
| 4,734,020 | A | * | 3/1988 | Inaba et al. ................. 384/369 |
| 5,178,471 | A | * | 1/1993 | Roessler et al. ............ 384/369 |
| 5,558,446 | A | * | 9/1996 | Kallenberger ............... 384/368 |
| 5,829,888 | A | * | 11/1998 | Bhargava et al. ............ 384/420 |
| 6,502,994 | B2 | * | 1/2003 | Jackson ...................... 384/420 |
| 2003/0035603 | A1 | * | 2/2003 | Kaiser ......................... 384/368 |
| 2003/0072507 | A1 | * | 4/2003 | Reynolds .................... 384/420 |

* cited by examiner

*Primary Examiner*—Marcus Charles
(74) *Attorney, Agent, or Firm*—William Anderson; Stephan Pendorf Patent Central LLC

(57) ABSTRACT

A thrust bearing, in particular for a turbo charger, has an essentially disc shaped bearing body (10) with a central through opening (12) for a shaft, at least one bearing surface (14) surrounding the through opening (12) for a collar which is placed on the shaft, and at least one oil supply channel which leads from a radially outer region of the bearing body to the through opening (12). In order to realize a cost effective manufacture of the thrust bearing it is proposed according to the invention that the at least one oil supply channel is designed to be a groove (16').

11 Claims, 1 Drawing Sheet

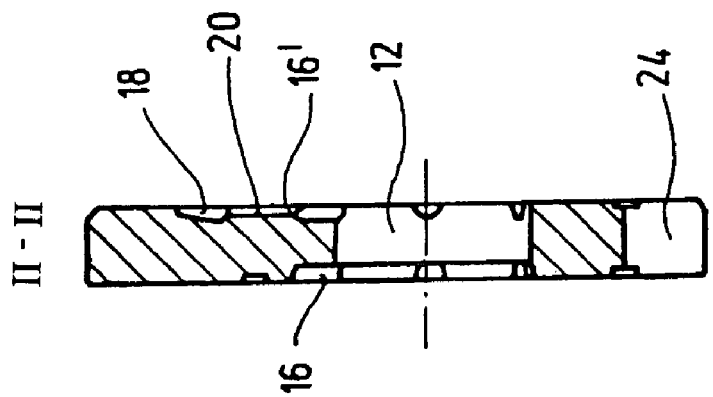
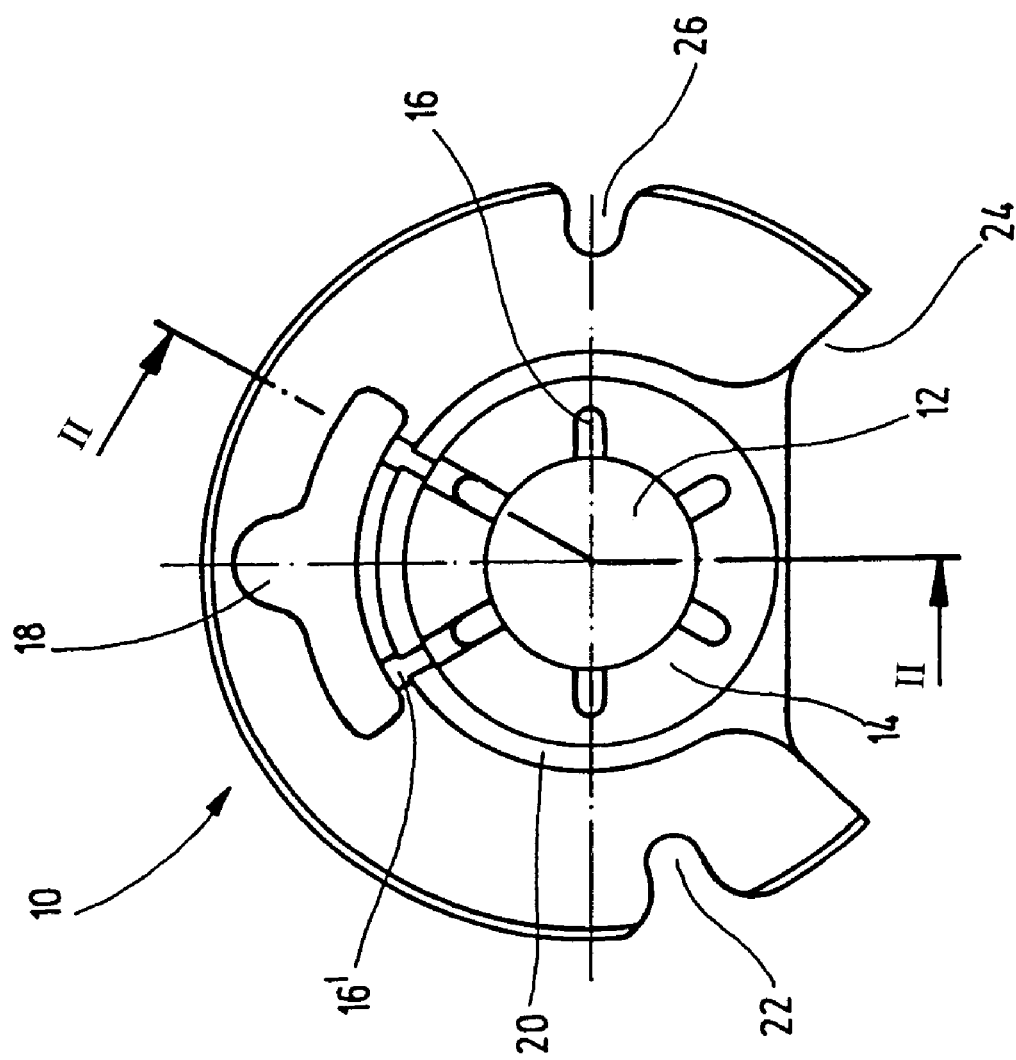

AXIAL BEARING

BACKGROUND OF THE INVENTION

1. Field of the Invention

The invention relates to a thrust bearing (axial bearing), in particular to a turbo charger, having an essentially disc shaped bearing body with a central through opening for a shaft, having at least one bearing surface surrounding the through opening for a collar which is placed on the shaft and also having at least one oil supply channel, which leads from a radially outer region of the bearing body to the through opening. The invention further relates to a turbo charger with a thrust bearing of such type.

2. Related Art of the Invention

The shaft of a turbo charger, for example, rotates with a high speed and therefore must be supported both axially as well as radially, since, depending on the load condition, axial forces are generated either through the compressor wheel or the turbine wheel. A thrust bearing of the type mentioned at the outset and which is fixed firmly in the shaft housing is used for absorbing such axial forces. The shaft is supported at each side on the thrust bearing by a collar which is fixed firmly on the shaft and is separated from the thrust bearing through a thin lubricating film. A recess is provided in a radially outer zone of the bearing body with the purpose of supplying lubricating oil to the bearing surfaces. This recess is provided with oil under pressure by way of oil supply channels in the bearing housing of the turbo charger. It is, however, necessary that the lubricating oil in this case is first led radially inwards to the shaft, from where it can reach the bearing surfaces over the oil supply channels. For this purpose the known thrust bearing has several radial bores which lead from the recess to the through opening. The disadvantage of this construction form is that, because of the flat design of the bearing body, it is not possible to drill directly from the recess to the through opening. Instead, it is necessary to radially drill through the complete bearing body, starting from the outer edge. Apart from the desired channels between the recess and the through opening, additional channels between the recess and the outer edge of the bearing body are formed. These additional channels need to be closed again, in order to prevent any escape of lubricating oil through these channels. Drilling these additional channels and again closing them is a very elaborate process, contributing heavily towards the total cost of the thrust bearing. Additionally, the is a risk that, in case of any deficiency in closing a channel, it could become free later, which would cause a collapse of the lubricating oil pressure and consequently damage to the bearing.

SUMMARY OF THE INVENTION

Based on this, it is the object of the present invention to provide a thrust bearing of the type described above, in which the bearing surfaces can be supplied with lubricating oil in a cost effective and safe manner.

The invention is based on the concept that a radial drilling of the bearing body can be avoided when the oil supply channel can be brought into the bearing body from the surface side. According to the invention the at least one oil supply channel is therefore made to be a groove. Thereby, it is possible to manufacture the bearing body, together with the grooves, by means of a drop forging, milling or stamping process. Drilling and closing of additional channels is no longer required, whereby the manufacturing cost of the thrust bearing is considerably reduced.

In a preferred embodiment of the invention, the bearing has an oil pocket, which is subjected to lubricating oil and which extends over a part of the periphery of the bearing body, concentrically to the through opening for the shaft, and starting from which the oil supply channel extends up to the through opening. The oil pocket acts as a reservoir for the lubricating oil and thus supports a steady oil supply for the bearing.

Further, bearing surfaces surrounding the through opening can be provided on both sides of the bearing body for the collars which are placed on the shaft on each side of the bearing, so that the shaft is supported in both the axial directions.

The oil supply channel is preferably made to be a radial groove and in further preferred embodiments, two or three oil supply channels, made to be radial grooves, are provided. Fundamentally, the number of grooves depend on the size and area of application of the thrust bearing and it is possible to provide more than three grooves. It is thereby ensured that the whole bearing area is adequately supplied with lubricating oil.

The bearing surface is appropriately divided into a number of wedge surfaces, which are separated from each other by grooves, wherein all wedge surfaces are preferably oriented in the same way in the peripheral direction and in the rotation direction of the shaft. The respective grooves join at the through opening for the shaft and supply the flat ends of the wedge surfaces with lubricating oil, which is then taken up by the rotating collar of the shaft and an appropriate lubricating film is created. With the exception of the oil supply channels, the grooves should not pierce the outer edge of the bearing surface, since the required oil pressure in the bearing can otherwise not be maintained.

In order to be able to drain the oil after it has flowed through the bearing, the bearing surface is encircled by an oil drain groove, by way of which the lubricating oil can flow downward into the bearing housing of the turbo charger. Since this oil drain groove is created radially between the bearing surface and the oil pocket, it is crossed by at least one oil supply channel. To avoid an excessive pressure loss over the oil drain groove, the area of cross section of the oil supply channel is appropriately considerably larger than the area of cross section of the oil drain groove.

The shape of the oil supply channels can be altered and can be made to suit the desired application. It is necessary on the one hand to determine the load bearing capacity of the bearing and, on the other, to minimize the frictional loss in the lubricating film. These two effects run counter to each other, which means that the more oil is delivered to the bearing area and the larger the cross section of the grooves is, the higher is the load bearing capacity of the bearing. On the other hand, if the rpm of the shaft is very high, a large amount of frictional force comes into play, which in turn leads to corresponding mechanical losses, with the result that the efficiency of the bearing is impaired when a large amount of oil is supplied. In a preferred embodiment of the invention, the oil supply channel has essentially a rectangular, V-shaped, semi-circular or semi-elliptical cross section. These shapes can be easily produced by a drop forging or a milling or stamping process.

Since the wedge surfaces are deployed at a very shallow angle, it is difficult to produce them with sufficient accuracy by means of a drop forging or milling or stamping process. In a preferred embodiment of the invention, the wedge surfaces are therefore embossed after drop forging, milling or stamping and subsequent surface grinding of the bearing body.

BRIEF DESCRIPTION OF THE DRAWINGS

The invention is now explained in greater detail with reference to an embodiment shown in the drawing, in which:

FIG. 1 shows a front view of a thrust bearing with oil supply channels, which are constructed as grooves.

FIG. 2 shows a section through the bearing along the line II-II in FIG. 1.

DETAILED DESCRIPTION OF THE INVENTION

The thrust bearing 10 shown in the drawing has a central through opening 12 for a shaft, for example, the shaft of a turbo charger. The through opening 12 is surrounded by six wedge surfaces 14 (not shown in detail), which together constitute the bearing surface of the bearing. The wedge surfaces 14 are separated from each other in the peripheral direction by six grooves 16, 16', which are arranged in a star-like formation and over which the wedge surfaces are supplied with lubricating oil. While the grooves 16 penetrate part of the bearing surface radially, the grooves 16' extend radially outwards and open into the oil pocket 18. The bearing surface is further surrounded by a peripheral groove 20, through which the lubricating oil can flow out after flowing through the bearing, wherein the area of cross section of this groove is smaller than the area of cross section of the grooves 16'. This is done to ensure adequate oil flow to the shaft. The edge slots 22, 24, 26 help in the assembling and positioning of the bearing body in the bearing housing of a turbo charger.

In operation, the oil pocket 18 is filled with lubricating oil, which is kept under pressure. The lubricating oil flows through the grooves. 16' to the rotating shaft and is distributed by the shaft in the circumferential direction, so that also the grooves 16 are supplied with lubricating oil. Since the bearing surface is made up of six wedge surfaces, which are deployed in the circumferential direction and which ascend in the direction of rotation of the shaft, a corresponding wedge space is formed between the wedge surfaces and the plane collar of the shaft, wherein the supply of oil takes place by way of the grooves 16, 16', which are adjacent to the blunt ends of the wedge spaces.

With regard to the bearing surface and the grooves, the back-side resembles the front side but it has neither an oil pocket nor oil supply channels 16'. Moreover, the supply of oil to the grooves 16 at the back-side takes place by way of the central through opening 12 and the shaft rotating therein.

In summary, the following is to be stated: The invention relates to a thrust bearing, particularly for a turbo charger, having an essentially disc shaped bearing body 10 with a central through opening 12 for a shaft, having at least one bearing surface 14 surrounding the through opening 12 for a collar disposed on the shaft, and having at least one oil supply channel which leads from a radially outer region of the bearing body to the through opening 12. In order to realize a cost effective manufacture of the thrust bearing, it is proposed according to the invention that the at least one oil supply channel is made to be a groove 16'.

The invention claimed is:

1. A thrust bearing for a turbocharger shaft having a collar, the thrust bearing comprising:
   an essentially disc shaped bearing body (10) with a central through opening (12) adapted to receive the shaft,
   at least one bearing surface (14) surrounding the through opening (12) adapted for the collar disposed on the shaft,
   an oil pocket (18) formed in the bearing body (10) extending concentrically with respect to the through opening (12) over part of the circumference of the bearing body (10), the oil pocket (18) being adapted to receive lubricating oil,
   at least one oil supply channel (16') extending from the oil pocket (18) to the through opening (12), wherein the at least one oil supply channel is a groove (16'), and
   an oil drain groove (20) encircling the at least one bearing surface (14) and being concentric to the through opening (12), wherein an area of cross section of the oil supply channel (16') is larger than an area of cross section of the oil drain groove (20).

2. The thrust bearing according to claim 1, further comprising bearing surfaces (14) on both sides of the bearing body (10) for one each collar which is placed on the shaft on either side of the bearing, said bearing surfaces surrounding the through opening (12).

3. The thrust bearing according to claim 1, wherein the oil supply channel is constructed as a radial groove (16').

4. The thrust bearing according to claim 1, wherein two or three oil supply channels are provided, which are constructed as radial grooves (16').

5. The thrust bearing according to claim 1, wherein the bearing surface is divided into a plurality of wedge surfaces (14), separated from each other by grooves (16,16').

6. The thrust bearing according to claim 5, wherein the wedge surfaces (14) are deployed evenly spaced in the circumferential direction.

7. The thrust bearing according to claim 5, wherein the exception of the oil supply channels, the grooves (16) do not pierce the outer edge of the bearing surface.

8. The thrust bearing according to claim 1, wherein the oil supply channel (16') has either a rectangular, V-shaped, semicircular or semi-elliptical cross section.

9. The thrust bearing according to claim 1, wherein the bearing body (10), together with the grooves (16, 16'), is manufactured by a drop forging, milling or stamping process.

10. The thrust bearing according to claim 9, wherein the wedge surfaces (14) are embossed.

11. A turbo charger comprising a thrust bearing having:
    an essentially disc shaped bearing body (10) with a central through opening (12) adapted for a shaft,
    at least one bearing surface (14) surrounding the through opening (12) adapted for a collar disposed on the shaft,
    an oil pocket (18) adapted to be subjected to lubricating oil and extending concentrically with respect to the through opening (12) over part of the circumference of the bearing body (10),
    at least one oil supply channel (16') extending from the oil pocket (18) to the through opening (12), wherein the at least one oil supply channel is designed to be a groove (16'), and
    an oil drain groove (20) encircling the at least one bearing surface (14) and being concentric to the through opening (12), wherein an area of cross section of the oil supply channel (16') is larger than an area of cross section of the oil drain groove (20).

* * * * *